Figure 4:
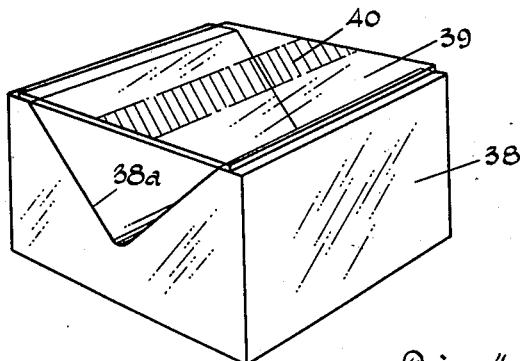

July 12, 1966 A. E. BADGER 3,260,584
METHOD OF CONTROLLING TEMPERATURES IN SHEET
GLASS WITH HEAT ABSORPTIVE MATERIAL
Original Filed Feb. 23, 1951 2 Sheets-Sheet 1
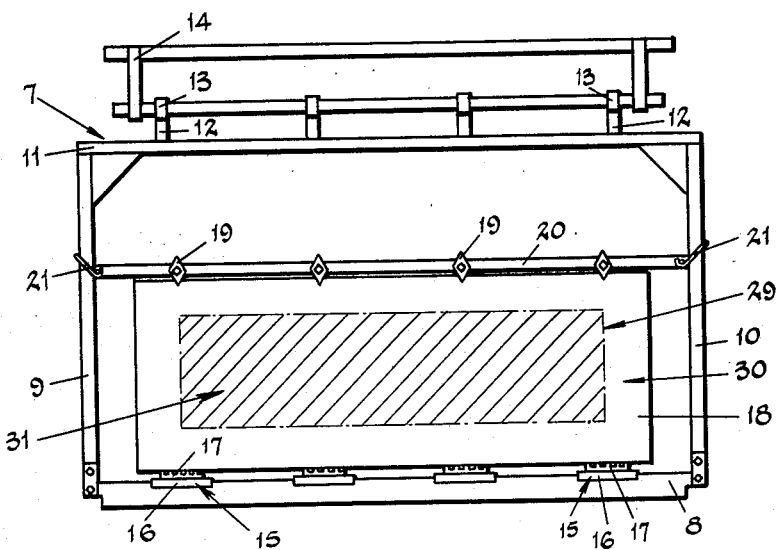
Fig. 1
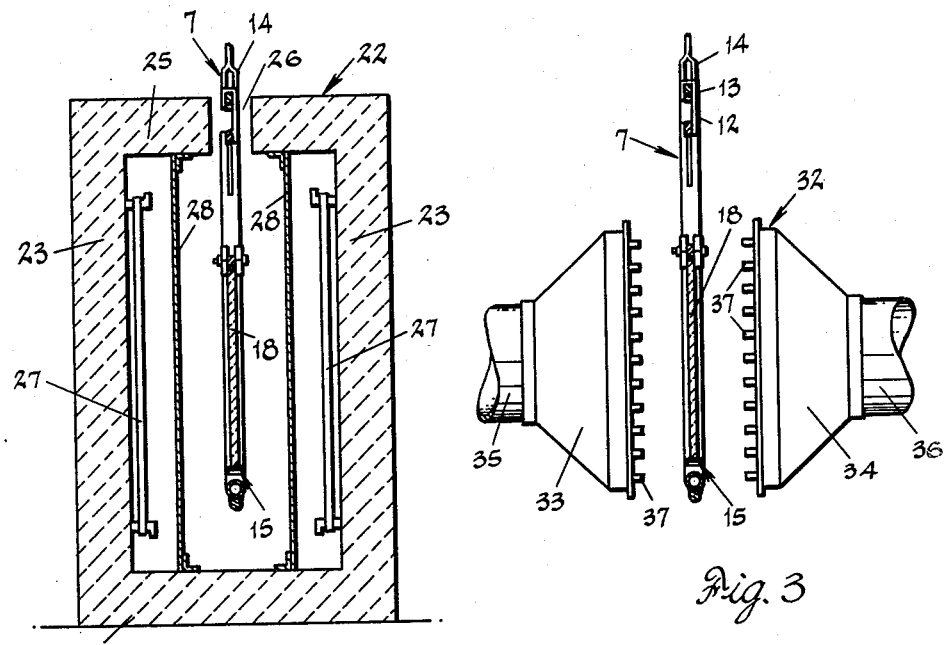
Fig. 2
Fig. 3
Inventor
Alfred E. Badger
Nobbe & Swope
Attorneys

United States Patent Office 3,260,584
Patented July 12, 1966

3,260,584
METHOD OF CONTROLLING TEMPERATURES IN SHEET GLASS WITH HEAT ABSORPTIVE MATERIAL
Alfred E. Badger, Maumee, Ohio, assignor to Libbey-Owens-Ford Glass Company, Toledo, Ohio, a corporation of Ohio
Continuation of abandoned application Ser. No. 571,917, Mar. 26, 1956, which is a continuation of abandoned application Ser. No. 212,367, Feb. 23, 1951. This application June 29, 1964, Ser. No. 381,607
20 Claims. (Cl. 65—60)

This application is a continuation of my copending application Serial No. 571,917, filed March 26, 1956 which in turn is a continuation of my application Serial No 212,367, filed February 23, 1951 both of which have now been abandoned.

The present invention relates broadly to the bending and/or tempering of glass and more particularly to an improved method for controlling the temperature and extent of heating of glass sheets or plates during the bending and/or tempering thereof.

In the tempering of glass sheets according to one known process, the sheets, while vertically suspended, are first heated to approximately the point of softening of the glass and then subsequently cooled to place the outer surfaces of said sheets under compression and the interiors thereof under tension. The treatment of the sheets in this manner not only materially increases the mechanical strength of the glass but further modifies its breaking characteristics in that, when broken, the glass sheet will disintegrate into innumerable small and relatively harmless particles instead of breaking into large dangerous pieces or slivers as is the case with ordinary glass sheets. However, in order to attain these desirable characteristics it is important that the glass sheet or plate be uniformly heated throughout its entire area. In addition, overheating of the sheet in one area and/or underheating in another area frequently results in increased liability of breakage during or immediately subsequent to the tempering operation.

Conversely, in certain bending operations it is desirable that the glass sheet be non-uniformly heated, that is, subjected to a relatively greater amount of heat in one area and/or a relatively lesser amount of heat in another area to effect the bending of the particular area chosen to a greater or lesser degree than the remainder of the sheet. As for example, in order to produce a glass sheet possessing a relatively sharp bend along one marginal edge that area must be specifically treated whereby the marginal edge portion will reach bending temperature slightly before and will thereby bend more sharply and rapidly than the remainding area of the sheet. In any method of controlling the amount of heat transmitted to various areas of the glass sheet, it is important that the temperature differential between the treated and untreated portions of said sheet or plate be gradual so that fracture of the glass along the line of bend will be minimized. In addition, the method utilized should preferably be capable of adaptability to various sizes and shapes of glass sheets with relative ease.

It is, therefore, an aim of this invention to provide a novel method of controlling the heating of selected portions of the glass sheets or plates in tempering and/or bending operations wherein the glass sheet or plate is coated in a defined area with either a high heat absorbent or low heat absorbent material.

Another object of the invention is the provision of an improved method of facilitating the tempering and/or bending of glass sheets or plates whereby thermal shock is minimized and liability of breakage substantially reduced by application to the glass sheet of a coating material having either a higher or lower heat absorptive characteristic than the glass to which it is applied.

A further object of the invention is to provide a novel and improved method of producing variable temperatures in glass sheets which consists primarily of coating a predetermined area of the sheet with a material of either high or low heat absorptive characteristics relative to the glass which substantially eliminates overheating or underheating in defined areas and which is easily removed upon completion of the operation.

Other objects and advantages of the invention will become more apparent during the course of the following description when taken in connection with the accompanying drawings.

Figure 5:
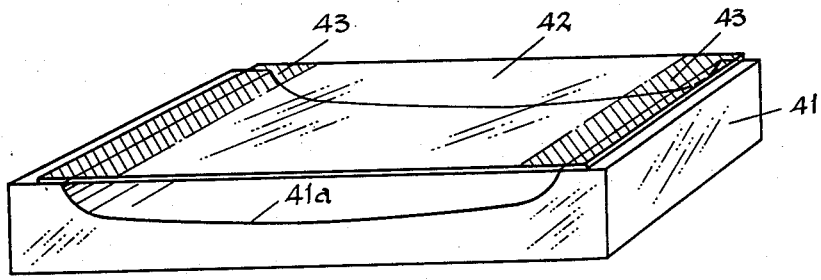
Figure 6:
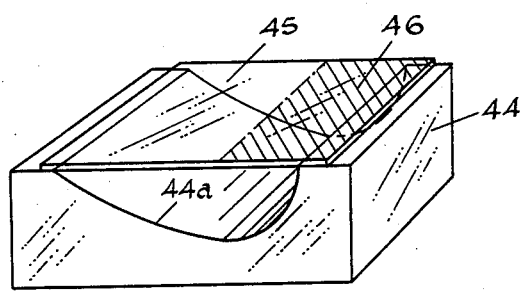

In the drawings, wherein like numerals are employed to designate like parts throughout the same:
FIG. 1 is a view of a glass sheet or plate coated in accordance with this invention and mounted in a supporting frame;
FIG. 2 is a vertical sectional view of one form of furnace used for tempering glass sheets;
FIG. 3 is a view of one form of cooling means utilized for tempering glass sheets;
FIG. 4 is a perspective view of one form of mold used for bending glass showing a sheet of glass supported thereon and coated in its central area;
FIG. 5 is a perspective view of another mold showing a sheet of glass carried thereupon and coated adjacent the marginal edges; and
FIG. 6 is a perspective view of another mold which may be used in bending glass showing a sheet of glass supported thereon and coated near one marginal edge.

Referring now to the drawings, and more particularly to FIGS. 1 to 3, there is shown one type of apparatus commonly utilized in the tempering of glass sheets or plates. This apparatus comprises a supporting frame designated in its entirety by the numeral 7, and comprising generally a horizontal bottom member 8, vertical side members 9 and 10 and a horizontal top member 11, said members being suitably secured to one another at their adjacent ends. The substantially rectangular frame 7 is carried by vertical hangers 12 suitably secured at their lower ends to the top member 11. The upper ends of the hangers 12 are shaped to form hooks 13 by which the said frame 7 can be suspended from a movable carriage 14 and conveyed thereby during the tempering operations.

Arranged along the bottom member 8 are a plurality of glass sheet supporting members or blocks 15, the base section 16 of which may be secured to the bottom member 8. Each supporting block may also be provided with an upper section 17 which contacts the lower edge of the glass sheet 18 and assists in rigidly supporting the sheet within the frame 7.

The upper marginal portion of the glass sheet is received between a plurality of pairs of retaining elements 19 which are spaced along a horizontal bar 20, the latter being supported at its opposite ends by the vertical side members 9 and 10 of the frame 7. The bar 20 is adjustably carried at its opposite ends by yokes 21 removably associated with the side members 9 and 10.

One type of furnace utilized in tempering glass sheets is shown in FIG. 2. This furnace, which is of the tunnel type, is generally indicated by the numeral 22 and comprises side walls 23, a bottom wall 24 and top wall 25 provided with a continuous middle slot 26. The furnace may be heated in any desired manner such as by means of electrical resistance heaters 27 along the side walls, and is preferably provided with baffle plates 28 in front of the heaters 27 to provide a more uniform heat in the working area of the furnace.

Experience has indicated that as a vertically suspended glass sheet is caused to progress forwardly through a furnace of the type illustrated, a substantially well-defined generally rectangular area spaced inwardly of the edges of the sheet tends to become heated to a relatively lesser extent than the portions of the sheet surrounding and extending outwardly of the rectangular area. As for example and with reference to FIG. 1, the relatively underheated area, designated by the numeral 29, may be found to lie within the phantom lines shown, while the relatively overheated area extends outwardly from the area 29 to the edges of the glass sheet 19 and is indicated by the numeral 30. And as has been noted above, such non-uniformity of heating prior to the sudden cooling of the glass sheet sometimes results in breakage of the glass, or at least in a reduction of the mechanical strength of the glass by the presence therein of both overheated and underheated areas.

To eliminate the above-mentioned difficulties and to provide a glass sheet which will be uniformly heated throughout its entire surface area, there is applied to the substantially rectangular area 29 a coating or film 31 of a material having relatively greater heat absorptive properties than the glass itself. This material may be any readily removable carbonaceous substance which does not fuse or permanently adhere to the glass, and for this purpose "Aquadag" or lamp black have been found quite successful.

It is preferred that the coating material be capable of forming a homogeneous and opaque film on the glass and for this purpose it is desirable that the selected substance be capable of going into a colloidal suspension or dispersion with a volatile liquid such as, for example, ethyl alcohol, water or a suitable resinous material. A liquid which evaporates readily under temperatures normally associated with the tempering operation is preferred so that after the glass sheet with the dispersion applied thereon is heated, there will remain on the glass a uniform opaque coating of the chemically-inert substance. After the material, such as "Aquadag" or lamp black, is colloidally dispersed in a suitable liquid and the dispersion adjusted to a moderately light consistency, it may be applied to the substantially rectangular area 29 in any well-known manner, as by a spray gun, brush or wiped on. "Aquadag" is a trade name of the Acheson Colloids Corp. for a colloidal dispersion of electric furnace graphite in distilled water, having a solids content of 22% by weight.

In practicing the invention, the coated glass sheet 18 to be tempered is positioned within the supporting frame 7 by locating the upper edge of the sheet between the pairs of retaining elements 19 and resting the lower edge on the vertically adjustable upper sections 17 of the blocks 15. The bar 20, which carries the retaining elements 19, may be vertically adjusted to accommodate glass sheets of different sizes and the upper sections 17 of the blocks 15 arranged to secure the sheet within the frame.

As the coated glass sheet or plate 18, carried within the frame 7, is caused to progress forwardly through the furnace 22 by means of the movable carriage 14, heat transmitted by the heaters 27 will be absorbed by the opposite surfaces of the glass sheet in a substantially uniform manner due to the presence of the coating 31 thereon. Thus, as the heat strikes the coating 31, which is applied to the substantially rectangular area 29, the heat will be almost entirely absorbed by the film or coating and in effect transferred to the sheet whereby the temperature of the coated area will be substantially equal to the uncoated area 30 of the glass sheet. Substantially simultaneously with the relatively greater heat absorption by the coated area 29, the remaining area 30 of the glass sheet will absorb heat in accordance with the heat characteristic of the glass so that when the heating of the plate is completed the entire surface area of the glass will have been heated to substantially the same degree. Thus, by means of the novel coating herein disclosed, the likelihood of breakage normally associated with non-uniform heating of the glass sheet is substantially precluded.

It is believed that the relatively greater heat absorption by the coated area of the glass sheet can be attributed to the characteristic black color of substances such as lamp black or "Aquadag." Such materials, being composed principally of carbon in one form or another, form an homogeneous black opaque film on the glass and due to this color do not reflect a substantial amount of heat. Uncoated glass, on the other hand, reflects a greater amount of heat. Thus, since the coating almost completely absorbs the heat transmitted to it while the uncoated portions absorb a relatively lesser amount of heat, the coated area of the glass sheet which would normally be underheated if not coated, is caused to have the temperature thereof raised to substantially the same degree as the remaining uncoated areas.

As an alternative proposition, should it be desirable to retard the heating of a designated area, as the area 30 of the glass sheet 18 adjacent and inward of the edges thereof, that area may be coated with a suspension of a substance possessing a relatively lesser heat absorptive characteristic than the glass, such as, for example, aluminum monohydrate, powdered clay, magnesia or any other opaque substance which is reflective and does not permanently adhere or fuse to the glass. It is also desirable that the material be readily removable after the tempering operation and be capable of suspension in a liquid such as water. Thus, as a glass sheet or plate with such a coating thereon passes through the tempering furnace, the coating of relatively lower heat absorptive material will serve to retard the absorption of heat in the area 30, so that both areas 29 and 30 of the glass will be heated to the normal temperature employed in tempering operations, and thereby a uniformity of heating attained throughout the entire sheet.

After the glass sheet has been heated to the desired temperature in the furnace 22, it is removed therefrom and is subjected immediately to the action of the cooling means 32, said means comprising spaced blower heads 33 and 34 connected to conduits 35 and 36, respectively, so that jets or blasts of air can be directed simultaneously upon opposite surfaces of the glass sheet when brought into position between said blower heads. Each blower head may be provided with a plurality of nipples 37 through which the jets or blasts of air are directed against the sheet. Upon completion of the cooling or quenching operation, and after the temperature of the glass sheet has been thereby substantially lowered, the residue of coating or layer 31 may be readily removed and the glass sheet subjected to the customary washing and inspection operations.

By way of example, when tempering sheets of ordinary soda-lime-silica glass, they are usually heated to a temperature of 1250 degrees F. before being subjected to sudden cooling.

As has been noted above, in the bending or shaping of glass sheets it is frequently desirable that a certain area of the sheet be either initially overheated or underheated in order to produce a bend of relatively greater or lesser curvature than the remainder of the glass sheet. Although presently existing methods of controlling the temperature of various portions of the glass sheet, such as mounting baffle plates over the area desired to be underheated or subjecting the portion of proposed greater curvature to the action of additional burners, have proven generally satisfactory, the present method is more easily and conveniently adaptable to various sizes and shapes of glass sheets and may be effected in the minimum amount of time.

As pointed out above, this invention is also applicable to the bending or shaping of glass sheets or plates to predetermined curvatures. In FIGS. 4 to 6 are shown typical bending molds which may be utilized to effect the desired amount of curvature or bend by the method herein provided. It will be appreciated that the molds illustrated are merely shown by way of example and that the present method of controlling the temperature of various areas of the glass sheet is not so limited but may be effectively utilized with any type mold such as, for example, peripheral or ring type molds.

In FIG. 4 is shown a concave mold 38 having a substantially V-shaped shaping surface 38a for effecting a sharp bend along the transverse center line of the glass sheet. Supported upon the upper surface of the mold is the flat glass sheet or plate 39 to be bent and which has been coated along the transverse center line with a layer 40 of a suitable efficient heat absorbing material. This material may be a suspension or dispersion of the substances noted above, that is, "Aquadag" or lamp black or any other carbonaceous substance with the characteristic deep black color and possessive of relatively greater heat absorptive qualities than the glass itself. The glass sheet 39 is preferably coated a sufficient distance outwardly toward both ends of the sheet from the center line thereof in the form of a relatively wide band to assure the absorption of a relatively greater amount of heat in the area of sharpest bend whereby the coated area will reach bending temperature in advance of or slightly before the remainder of the sheet. That is, the coated area should be of sufficient width to assure the rapid conformation of that area to the apex of the proposed angle of bend and to a relatively small region immediately adjacent that angle substantially simultaneously with the conformation of the remaining portions of the glass sheet or plate to the curvature of the mold.

After the application of the coating material or layer 40 to the predetermined area of the glass sheet, the mold 38 is introduced into a suitable bending furnace. Generally speaking, the glass sheet may be caused to pass through successive heating zones until the temperature of the sheet reaches approximately 1150 degrees Fahrenheit. At that temperature the coating material, due to its efficient heat absorptive qualities, attracts and absorbs a relatively greater amount of heat than the uncoated area. Therefore, as the entire sheet reaches the softening temperature and descends slowly downwardly to conform to the shaping surface of the mold, the coated area will have already reached the bending temperature and the entire glass sheet will substantially simultaneously conform to the curvature of the mold.

Thus, it will be seen that the coated area attracts and absorbs a relatively greater amount of heat than the remainder or uncoated portions of the glass sheet. As the glass sheet passes through the furnace, the coating on the glass sheet, being of an opaque substantially black material, more completely absorbs the radiated heat while the remainder of the sheet, being reflective, is substantially absorbing but partially heat repelling. However, as the remainder of the sheet reaches bending temperature, the coated area having already reached that point, the entire sheet will slowly descend by the force of gravity and the coated area readily conform to the region in and surrounding the angle of bend of the shaping mold.

In FIG. 5 there is provided a mold 41 having a substantially cylindrical shaping surface 41a. Supported upon the upper surface of the mold is a glass sheet or plate 42 suitably coated along its opposite marginal end edges with a layer or coating 43 of the material above described. As previously noted, this may be a suitable liquid carrying any colloidally dispersed carbonaceous material, such as, for example, "Aquadag." The coating material, applied in any convenient manner, such as for example, by brushing or wiping, extends inwardly from the edges to a line substantially equal to the length of the critical area of the bend. That is, in order to attain the maximum efficiency in controlling the heating of the sheet in the coated areas, the layer 43 preferably extends up to or slightly beyond the area of sharpest curvature or bend.

As noted above, as the glass sheet is heated the coated areas will absorb the heat to a relatively greater extent than the remaining uncoated regions, will reach bending temperature slightly in advance thereof, and will be caused thereby to conform to the curvature of the mold face at substantially the same moment as the remainder of the sheet.

In FIG. 6 is illustrated a variation in the type of shaping mold which may be successfully employed with the present method of bending control. Supported upon the upper surface of the mold 44, and carried above a shaping surface 44a which conforms substantially to a portion of a parabola, is a glass sheet or plate 45 which has been suitably coated along one end by a layer or coating 46 of the carbonaceous material above described. The coating material is suitably applied inwardly from one edge of the sheet for a distance approximately equal to the surface length of the greatest amount of curvature of the partial parabolic shape and spaced inwardly from the other edge of the glass sheet. The effect of the coating material is substantially similar to that above disclosed. That is, as the sheet is heated, the coated area thereof will attract and absorb a relatively greater amount of heat than the uncoated portion with the result that the portion of the glass which has been treated will readily descend toward the greatest curvature of the mold while the remainder or uncoated portion will descend downwardly at a slower rate and contact the desired surface of the mold at substantially the same instant as the treated portion.

If desired, substantially similar results may be attained by coating the areas of the glass sheet not treated above with a material possessing relatively lesser heat absorptive qualities than the glass. Thus, those areas noted above which were formerly coated with a carbonaceous material now may be left uncoated and the remaining areas coated with a readily removable opaque suspension of aluminum monohydrate, powdered clay, magnesia or other substances possessing reflective properties and with fusion points above that of the glass sheet. This material may be applied in any suitable manner and has the effect during the bending operation of absorbing a relatively lesser amount of heat than the untreated portion of the sheet. Thus, as the glass sheet is heated, heat will be reflected by the coating and thereby less heat absorbed by the coated portion, while the untreated area will absorb a relatively greater amount of heat, in accordance with the heat absorptive properties of the glass, and conform to the curvature of the mold at approximately the same time as the coated region.

As noted above, in connection with the application of carbonaceous material to the glass sheet, it will be appreciated that the method of applying a substance of relatively low heat-absorptive qualities is of equal application to any type or shape mold, and that the invention is not restricted to any specific use but may be effectively utilized in any operation wherein variable temperatures in different areas of a glass sheet are necessary or desirable. However, in any event, it will be appreciated that the heat used in treating the sheets regardless of the coating material is always below the temperature at which the sheets will be destroyed, or in other words, lose their general identity.

It is to be understood that the forms of the invention herewith described are to be taken as illustrative embodiments only of the same, and that various procedural changes may be resorted to without departing from the spirit of the invention or the scope of the subjoined claims.

I claim:

1. A process for submitting a glass article, in particular a glass sheet, to a controlled heat treating operation which consists in coating a selected part of a glass article that is to be subjected to a different rate of heating than other parts with a substance adhering to the glass surface and having radiant heat attenuating properties capable of controlling the conditions of the heat exchange between said article and the thermal source, heating said article thus coated by subjecting the same to an environment having an ambient temperature in the glass softening range, cooling said coated article, and then removing said coating from the article.

2. A process for submitting a glass article, in particular a glass sheet, to a bending operation while supported at marginal portions only which consists in coating a selected part of the glass article with a substance adhering to the glass surface and having radiant heat attenuating properties capable of controlling the conditions of heat exchange between said article and the thermal source, heating said article thus coated to bring the same to a temperature suitable for bending, cooling said bent coated article and then removing said coating from the article.

3. A process for submitting a glass article, in particular a glass sheet, to a bending operation which consists in coating a part of the glass article in which a bend is desired with a substance adhering to the glass surface and having a relatively higher heat absorptive characteristic than the glass article to cause said part to absorb heat faster than other parts of said article, heating said article thus coated to bending temperature and bending the same, cooling said bent coated article, and then removing said coating therefrom.

4. A process for submitting a glass article, in particular a glass sheet, to a bending operation which consists in coating a part of the glass article in which less bend is desired than in other parts with a substance adhering to the glass surface and having relatively lower heat absorptive characteristics than the glass article to retard the heating thereof, heating said article thus coated to bending temperature and bending the same, cooling said bent coated article, and then removing said coating therefrom.

5. A process as defined in claim 4 wherein the coating material is reflective, readily removable and chemically inert.

6. A process for submitting a glass article, in particular a glass sheet, to a bending operation while supported at marginal portions only and in which a selected part of the glass article is to be bent to a lesser extent than other portions of the glass article which consists in coating said selected part of the glass article with a substance adhering to the glass surface and having heat reflective properties capable of controlling the conditions of the heat exchange between said article and the thermal source, heating said article thus coated to bring the uncoated parts to a temperature suitable for bending and to bend the same while said coated part due to the action of the coating is at a reduced temperature relative thereto, cooling said bent coated article and then removing said coating from the article.

7. In the art of heat treating glass sheets wherein the glass is subjected to temperatures in the glass softening range; the improvement comprising applying only to selected regions where greater heating is required than in other regions a film of heat absorbing oxidizable material, which oxidizes and disintegrates at the glass softening temperatures without marring the glass during its disintegration and to provide heat of oxidation, prior to subjecting the entire glass sheet to heat treating temperatures; subsequently subjecting the partially covered glass to an environment having an ambient temperature in the glass softening range; and oxidizing and disintegrating the heat absorbing oxidizable material to produce heat of oxidation at said selected regions and thereby apply additional heat to the glass in said selected regions.

8. In the art of bending glass sheets, wherein glass is bent to nonuniform curvatures including critical regions spaced from the margin of the glass sheets where the glass is sharply curved, by mounting the glass in sheet form upon a mold having an upper shaping surface conforming in outline to the shape desired for the glass and subjecting the mounted glass to temperatures sufficient to soften the glass thus sagging the latter to the shaping surface of the mold, the improvement comprising applying to the critical regions only, a film of heat absorbing oxidizable material which oxidizes and disintegrates at the glass softening temperatures without marring the glass during its disintegration and to provide heat of oxidation, prior to subjecting the entire glass sheet to glass bending temperatures, subsequently subjecting the partially covered glass to an environment having an ambient temperature in the glass softening range, and oxidizing and disintegrating the heat absorbing oxidizable material to produce heat of oxidation at said critical regions and thereby apply additional heat to the glass in said critical regions.

9. In the method according to claim 8 wherein the heat absorbing material is applied as a pulverized suspension in a volatile conveyor.

10. The improvement according to claim 8 wherein the heat absorbing material is a suspension of pulverized carbon black in a volatile conveyor.

11. A process for submitting a glass article, in particular, a glass sheet to a tempering operation in which the heating of a selected part of the glass article is to be retarded relative to other portions of the glass article, which consists in coating said selected part of the glass article with a substance adhering to the glass surface and having heat-reflective properties capable of controlling the conditions of the heat exchange between said article and the thermal source, heating said article thus coated at such a rate as to bring the uncoated parts to a temperature suitable for tempering while the temperature of said coated part is retarded relative thereto, rapidly chilling said coated article and then removing said coating from the article.

12. A process for tempering a glass article, in particular, a glass sheet in which the heating of at least a selected part of the glass article is to be retarded relative to other parts of the glass article, which consists in applying to said selected part of the glass article a paint having heat-reflective properties capable of controlling the conditions of the heat exchange between said article and the thermal source, heating said article thus painted at such a rate as to bring the unpainted parts to a temperature suitable for tempering while the heating of the selected part is retarded relative thereto, rapidly chilling said painted article and then removing the paint from the article.

13. A method for submitting a glass sheet to a controlled tempering in which the heating of a selected part of the sheet is to be retarded relative to other parts, which consists in applying to said selected part a coating material having reflective properties, in submitting the thus coated sheet to a heating operation over its whole surface at such a rate as to bring the uncoated portion to the temperature convenient for tempering while the heating of the coated part due to the action of the coating is retarded, and then chilling the sheet.

14. A method for submitting a glass sheet to a controlled tempering operation in which the heating of a selected part of the sheet is to be retarded relative to other parts, which consists in applying to said selected part a coating material having reflective properties and capable of remaining effective during the heating phase of the tempering operation, in submitting the thus coated glass sheet to a heating action over its whole surface at such a rate as to bring the uncoated portion to the temperature convenient for tempering while the heating of the coated part, due to the action of the coating, is retarded, cooling rapidly the glass sheet in the presence of the coating, and then removing the coating.

15. A method for submitting a glass sheet to a controlled tempering, which consists in applying to a selected part a coating material having reflective properties, in submitting the thus coated sheet to a heating operation over its whole surface to bring the uncoated portion to the temperature convenient for tempering while the heating of the coated part due to the action of the coating is retarded, and then chilling the sheet.

16. A method for submitting a glass sheet to a controlled tempering operation, which consists in applying to a selected part a coating material having reflective properties and capable of remaining effective during the heating phase of the tempering operation, in submitting the thus coated glass sheet to a heating action over its whole surface to bring the uncoated portion to the temperature convenient for tempering while the heating of the coated part, due to the action of the coating, is retarded, cooling rapidly the glass sheet in the presence of the coating, and then removing the coating.

17. A method of controlling the tempering of glass sheets or plates, comprising applying to an area of a glass sheet to be tempered where greater heat is desired than in other areas a readily removable, opaque and non-fusible film of a volatile solution of colloidally suspended graphite, heating the filmed sheet to substantially the point of softening of the glass, directing blasts of a cooling fluid against opposite surfaces of the sheet, and removing the film upon completion of the tempering operation.

18. A method of uniformly tempering glass sheets or plates, comprising applying to a substantially rectangular area of a glass sheet to be tempered that is spaced from the edges thereof and normally heats to a lesser degree than other areas a readily removable homogeneous, opaque and chemically-inert film of colloidally dispersed graphite, heating the filmed sheet to substantially the point of softening of the glass, directing blasts of a cooling fluid against opposite surfaces of the sheet, and removing the film upon completion of the tempering operation.

19. A method of controlling the tempering of glass sheets or plates, comprising applying to a predetermined area of a glass sheet to be tempered where less heating is required than in other areas an opaque coating of a readily removable reflective material having relatively lesser heat absorptive characteristics than the glass, heating the coated sheet to substantially the point of softening of the glass, directing blasts of a cooling fluid against opposite surfaces of the sheet, and removing the coating upon completion of the tempering operation.

20. A method of uniformly tempering of glass sheets or plates comprising applying to an area of a glass sheet to be tempered inwardly of the edges thereof and that normally heats to a higher degree than other areas an opaque non-fusible coating of a volatile solution of a readily removable reflective material having a relatively lesser heat absorptive characteristic than the glass, heating the coated sheet to substantially the point of softening of the glass, directing blasts of a cooling fluid against opposite surfaces of the sheet, and removing the coating upon completion of the tempering operation.

References Cited by the Examiner
UNITED STATES PATENTS

| | | | |
|---|---|---|---|
| 2,332,099 | 10/1943 | McKinnis | 21—54 |
| 2,622,053 | 12/1952 | Clowe et al. | 156—272 |
| 2,646,647 | 7/1953 | Bamford et al. | 65—103 |
| 3,149,945 | 9/1964 | Bertrand et al. | 65—60 X |

DONALL H. SYLVESTER, *Primary Examiner.*

A. D. KELLOGG, *Assistant Examiner.*